United States Patent
Varnadore et al.

(10) Patent No.: US 12,479,955 B2
(45) Date of Patent: Nov. 25, 2025

(54) NON-SULFONATED POLYESTER ACRYLATES AND COATINGS EMPLOYING SAME

(71) Applicant: Jain-Chem, Ltd., Taylors, SC (US)

(72) Inventors: Clint L. Varnadore, Simpsonville, SC (US); Surendra Jain, Greer, SC (US)

(73) Assignee: Jain-Chem, Ltd., Taylors, SC (US)

( * ) Notice: Subject to any disclaimer, the term of this patent is extended or adjusted under 35 U.S.C. 154(b) by 0 days.

(21) Appl. No.: 18/394,966

(22) Filed: Dec. 22, 2023

(65) Prior Publication Data

US 2024/0124646 A1 Apr. 18, 2024

Related U.S. Application Data

(63) Continuation of application No. 18/112,257, filed on Feb. 21, 2023, now abandoned, which is a continuation of application No. 17/466,887, filed on Sep. 3, 2021, now abandoned.

(60) Provisional application No. 63/074,286, filed on Sep. 3, 2020.

(51) Int. Cl.
  C08G 63/79 (2006.01)
  C08G 63/47 (2006.01)
  C09D 167/06 (2006.01)

(52) U.S. Cl.
  CPC ............ *C08G 63/79* (2013.01); *C08G 63/47* (2013.01); *C09D 167/06* (2013.01)

(58) Field of Classification Search
  None
  See application file for complete search history.

(56) References Cited

U.S. PATENT DOCUMENTS

| | | |
|---|---|---|
| 3,825,509 A | 7/1974 | Miller |
| 4,187,768 A | 2/1980 | Suzuki |
| 4,329,389 A | 5/1982 | Kimbrell, Jr. |
| 4,452,596 A | 6/1984 | Clauss et al. |
| 4,518,649 A | 5/1985 | Wang et al. |
| 4,715,527 A | 12/1987 | Tsuzuki et al. |
| 4,916,181 A | 4/1990 | Maska et al. |
| 4,977,191 A | 12/1990 | Salsman |
| 4,999,128 A | 3/1991 | Sonenstein |
| 5,234,753 A | 8/1993 | Williams, Jr. |
| 5,252,615 A | 10/1993 | Rao et al. |
| 5,349,026 A | 9/1994 | Emmons et al. |
| 5,371,112 A | 12/1994 | Sayre et al. |
| 5,385,971 A * | 1/1995 | Sauer .................. C08F 2/16 524/556 |
| 5,507,640 A | 4/1996 | Gilmer et al. |
| 5,694,746 A | 12/1997 | Chung et al. |
| 5,725,951 A | 3/1998 | Schuette et al. |
| 5,763,100 A | 6/1998 | Quick et al. |
| 5,858,551 A | 1/1999 | Salsman |
| 6,001,922 A | 12/1999 | Clark et al. |
| 6,008,182 A | 12/1999 | Salsman et al. |
| 6,113,981 A | 9/2000 | Ogilvie, Jr. et al. |
| 6,458,443 B2 | 10/2002 | Collier et al. |
| 6,579,837 B1 | 6/2003 | Fleury et al. |
| 6,592,218 B1 | 7/2003 | Salsman |
| 6,652,435 B1 | 11/2003 | Sand |
| 6,893,693 B2 | 5/2005 | Swoboda et al. |
| 8,198,068 B2 | 6/2012 | Wu et al. |
| 8,410,041 B2 | 4/2013 | Kutsenko et al. |
| 8,852,493 B2 | 10/2014 | Räisänen et al. |
| 9,670,621 B2 | 6/2017 | Pang et al. |
| 9,732,474 B2 | 8/2017 | Koenig et al. |
| 10,065,779 B2 | 9/2018 | Harmon |
| 10,590,606 B2 | 3/2020 | Mongrain et al. |
| 2003/0127210 A1 | 7/2003 | Pelletier et al. |
| 2004/0161604 A1 | 8/2004 | Demott |
| 2005/0095933 A1 | 5/2005 | Kimbrell et al. |
| 2011/0011549 A1 | 1/2011 | Pierce et al. |
| 2011/0017417 A1 | 1/2011 | Ehrhardt |
| 2013/0042975 A1 | 2/2013 | Bugas et al. |
| 2016/0168799 A1 | 6/2016 | Constant |
| 2018/0058010 A1 | 3/2018 | Mongrain et al. |
| 2020/0181849 A1 | 6/2020 | Esgueva Gutierrez et al. |

FOREIGN PATENT DOCUMENTS

| | | | |
|---|---|---|---|
| AU | 2004252163 A1 * | 1/2005 | |
| CA | 2280552 A1 * | 2/2000 | |
| CA | 2656720 | 6/2008 | |
| JP | 2004003076 A * | 1/2004 | |
| NL | 8100378 | 8/1981 | |

* cited by examiner

*Primary Examiner* — Tae H Yoon
(74) *Attorney, Agent, or Firm* — Nelson Mullins Riley & Scarborough LLP

(57) ABSTRACT

A process for emulsion polymerization is provided wherein a non-sulfonated polyester as a protective colloid in the process is provided. The non-sulfonated polyester may be an ethoxylated polyester. A product made by such process and a coating containing the product is also provided.

3 Claims, No Drawings

NON-SULFONATED POLYESTER ACRYLATES AND COATINGS EMPLOYING SAME

RELATED APPLICATION

This is a continuation application of U.S. patent application Ser. No. 18/112,257 filed on Feb. 21, 2023 (now Abandoned), which is a continuation application of U.S. patent application Ser. No. 17/466,887, filed on Sep. 3, 2021 (now Abandoned), which claims the benefit of U.S. Provisional Patent Application No. 63/074,286, filed on Sep. 3, 2020, the entire disclosure of which is incorporated by reference herein.

FIELD OF THE INVENTION

The present invention relates generally to a process using a water-soluble or water-dispersible, non-sulfonated polyester resin as a protective colloid in a process of making water-based acrylic emulsions with or without the use of known protective colloids so as to be a surfactant-free polymer, whose resulting polyester acrylate emulsions can be used in or as coatings for various substrates. Commonly known colloids such as low molecular weight styrene/acrylic acid, styrene/maleic anhydride (SMA resins), polyvinyl alcohol (PVOH), hydroxyethyl cellulose (HEC), other cellulose-based polymers, and sulfonated polyester resins, ethoxylated alcohols, sulfonated alcohols, and other commonly known surfactants known to the art, and the like may also be employed in the coatings. Such polyesters influence the end use properties of the coating.

BACKGROUND OF THE INVENTION

Polymer emulsions stabilized with known protective colloids, such as those mentioned above, are common in the industry. They find multiple uses as coatings, binder, and treatments. For example, they are used as pigment binders in textile printing, sizing and coatings of paper, tuft lock on tufted carpets, binders in paints and coatings, binders for glass or wood composites, wood coatings, concrete coatings, leather treatments, ink resins, metal treatments, floor polishes, etc.

The foregoing examples of the related art and limitations related thereto are intended to be illustrative and not exclusive. Other limitations of the related art will become apparent to those skilled in the art upon a reading of the specification and a study of the drawings.

SUMMARY OF THE INVENTION

Briefly, the present invention is directed, in an embodiment, to the use of non-sulfonated polymer resins as protective colloids and stabilizers in emulsion polymerization processes. Such polyester resins may be derived from waste polyester, such as fiber, films, beverage bottles, commonly known as rPET, but virgin polyester resins can also be used. These water-soluble or water dispersible, non-sulfonated polyesters can also be made from virgin monomers by persons familiar with the art. The following U.S. patents describe examples of non-sulfonated polyesters resins: U.S. Pat. No. 4,916,181 (Rudolf et al.); U.S. Pat. No. 5,252,615 (Rao et al.); U.S. Pat. No. 4,977,191 (Salsman); U.S. Pat. No. 5,858,551 (Salsman); U.S. Pat. No. 5,371,112 (Sayre et al.); U.S. Pat. No. 6,579,837 (Fleury et al.); U.S. Pat. No. 4,999,128 (Sonenstein); U.S. Pat. No. 6,592,218 B1 (Salsman).

One objective of using rPET is that it converts the plastic waste into a renewable resource, reducing the plastic waste from landfill and ocean.

Another objective is to provide stable dispersions, without the use of commonly used emulsifiers known to the art.

Another object is to provide stable dispersions and emulsions.

Specifically, the invention provides protective-colloid-stabilized polymer compositions in the form of their aqueous polymer dispersions or water-dispersible polymers, which comprise a protective colloid wherein the protective colloid is a non-sulfonated condensation product made from di- or polycarboxylic acids and from at least one compound selected from the group comprising diols, and polyols.

DETAILED DESCRIPTION OF PREFERRED EMBODIMENTS

Reference now will be made in detail to the embodiments of the invention, one or more examples of which are set forth below. Each example is provided by way of explanation of the invention, not a limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. The following embodiments and aspects thereof are described and illustrated in conjunction with systems, tools and methods which are meant to be exemplary and illustrative and not limiting in scope. In various embodiments one or more of the above-described problems have been reduced or eliminated while other embodiments are directed to other improvements.

Thus, it is intended that the present invention covers such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

The protective colloids according to the invention are prepared from unsaturated and or saturated polyesters. The synthesis of polycondensates of these types are known to the person skilled in the art and described in detail in previous cited Patent examples. The preferred, but not limited to, methods are outlined in Salsman in U.S. Pat. Nos. 4,977,191 and 5,858,551. In general, the colloidal, non-sulfonated polyester is a condensation reaction through esterification and trans-esterification having the following general formula: $I_n$-P-$A_m$ wherein I is the ionic group; n is an integer in the range of 1-3 and defines the number of ionic groups; P is a polyester backbone; A is an aliphatic group; and m is an integer in the range of 3-8 and defines the number of aliphatic groups.

The ionic group "$I_n$" needed for water-dispersibility can be an oxyalkylated polyol and or carboxylic acid which is introduced into the resin by polyacid monomers such as trimellitic anhydride, trimellitic acid, or maleic anhydride. The polyacid is preferably selected from the group consisting of ethylenically unsaturated aliphatic or aromatic mono, di- or polycarboxylic acids or their reactive derivatives such as anhydrides, generally having from 3 to 10 carbon atoms and from 1 to 4 carboxylic acid functions or the carboxylic anhydride groups derived therefrom. Examples of these are isophthalic acid, terephthalic acid, phthalic anhydride (acid), adipic acid and etc. Other preferred polyacids but not limited to are phthalic anhydride (acid), isophthalic and terephthalic acids, adipic acid, citric acid, citraconic acid, lactic acid, mesaconic acid, fumaric acid, itaconic acid, 2,6 naphthalene dicarboxylic acid, sebacic acid and glutaric acid. Mixtures of the above acids and anhydrides can be used in the practice of the present invention. The weight percent of ionic monomers in the resin is from 1% to 30% percent.

The backbone "P" of the colloidal non-sulfonated polymer is composed of polyester groups. It can be any linear or branched polyester made using any of the above mentioned polyacids, and polyalcohols. The preferred method, but not limited to, is to generate the backbone using rPET sources. Preferably the terephthalate polymer or waste terephthalate polymer is polyethylene terephthalate, polybutylene terephthalate, poly-(cyclohexanedimethanol terephthalate) or a mixture thereof. It will be understood that, for reasons of economy, the use of waste terephthalates is preferred. However, the use of virgin terephthalate resins is to be included within the scope of the disclosure and appended claims. The weight percent of the polyester backbone ingredients range from 20-80% of the whole resin, with the most preferred being 50-60%. Such backbone is typically derived by reacting PET such as rPET with a hydroxy functional compound containing at least two hydroxyl groups. The hydroxy functional compound having at least two hydroxy groups is selected from the group consisting of 1,2-ethanediol, diethylene glycol, triethylene glycol, 1,2-propanediol, 1,3-propanediol, 1,2-butylene glycol, 1,3-butanediol, 1,4-butanediol, 1,5-pentanediol, 1,6-hexanediol, 1,7-heptanediol, 1,8-octanediol, 1,9-nonanediol, 1,10-dodecanediol, 1,11-undecanediol and 1,12-dodecanediol; di-, tri-, tetra- and pentaethylene glycols; 1,4-bis(hydroxymethyl) cyclohexane, 1,4-cyclohexanediol and 2,2'-dimethylpropanediol (neopentyl glycol), polyethylene glycol with number-average molecular mass of the order of 100 to 80,000, glycerol, trimethylolpropane, trimethylolethane, pentaerythritol, erythritol or a monosaccharide. The oxyalkylated polyol is derived from any polyol, having three or more alcohol functions. Polyols include glycerol, trimethylolpropane, trimethylolethane, pentaerythritol, erythritol, sorbitol, mannitol, other sugar alcohols or monosaccharides. The polyols are oxyalkylated with an alkylene oxide, including, but not limited to, ethylene oxide, propylene oxide, butylene oxide, amylene oxide, etc. Preferably, the oxyalkylated polyol is glycerol, trimethylolpropane, trimethylolethane, pentaerythritol, erythritol or a monosaccharide, oxyalkylated with 2-100 moles of ethylene oxide, propylene oxide or a mixture thereof, per hydroxyl of the polyol.

The aliphatic groups "A" may consist of 6-24 carbon chain fatty acids or triglycerides thereof such as stearic, oleic, palmitic, lauric, linoleic, linolenic, behenic acid or their mixtures. These can come from hydrogenated or unhydrogenated animal or vegetable oil, such as beef tallow, lard, corn oil, soybean oil, etc. The weight percent of the aliphatic moiety can be less than 60%.

There are many known manufacturing methodologies for these polycondensation reactions for those versed in the art. The incorporation of the various combinations of ionic and aliphatic groups will affect the end use requirements and dispersion techniques of these polymers. The preferred method is described in Salsman in U.S. Pat. Nos. 4,977,191 and 5,858,551.

The proportion of protective colloid in the aqueous polymer dispersion composition may be generally up to 50% by dry weight, or from 15 to 40% by dry weight, based on the amount of base polymer.

Suitable base polymers are polymers of one or more monomers selected from the class consisting of esters of acrylic acid or methacrylic acid such as methyl acrylate, methyl methacrylate, ethyl acrylate, ethyl methacrylate, glycidyl methacrylate, isobornyl acrylate, propyl acrylate, propyl methacrylate, n-butyl acrylate, n-butyl methacrylate, n-hexyl methacrylate, n-propyl methacrylate, acrylonitrile, vinyl acetate, and 2-ethylhexyl acrylate and the like (used in examples as arylates). Other comonomers such as styrene, methylstyrene, and vinyl toluene may be incorporated.

If desired, from up to 10% by weight of functional monomers, such as ethylenically unsaturated mono- and dicarboxylic acids, preferably acrylic acid, methacrylic acid, fumaric acid, itaconic, acid, or maleic acid (used in examples as Acids); ethylenically unsaturated carboxamides and ethylenically unsaturated carbonitriles; mono- and diesters of fumaric and maleic acids such as the diethyl and diisopropyl esters, and also maleic anhydride.

Post-crosslinking comonomers (Crosslinkers) such as N-methylolacrylamide (NMA), N-methylolmethacrylamide, allyl N-methylolcarbamate, Epoxide-functional comonomers such as glycidyl methacrylate and glycidyl acrylate are also suitable. Compounds such as diacetoneacrylamide and acetylacetoxyethyl acrylate and methacrylate can also be used. Post-crosslinking comonomers are reacted during the emulsion polymerization and upon drying perform the crosslinking action of the functional monomers listed above.

Some or all of the polyesters and/or other colloidal stabilized polymers are added to the polymer prior to or during the polymerization. The polymerization temperature when preparing the base polymers by emulsion or suspension polymerization is generally from 40 to 100° C.

Particular preference is given to free radical emulsion polymerization, with initiation of the monomers using thermal initiators or redox-initiator combinations which are common in the art of emulsion polymerization (used in examples as Catalysts and Chasers). Examples of suitable initiators are hydroperoxides such as tert-butyl hydroperoxide, cumene hydroperoxide and isopropylbenzene monohydroperoxide, hydrogen peroxide, or azo compounds, such as azobisisobutyronitrile (VAZO™ 64). Suitable inorganic initiators are the ferrous, sodium, potassium and ammonium salts of peroxodisulfuric acid. The initiators mentioned are usually used in amounts of from 0.05 to 4% by weight, based on the total weight of the monomers.

The redox initiators used are combinations of the initiators mentioned with reducing agents. Suitable reducing agents are the sulfites and bisulfites of the alkali metals or of ammonium, for example sodium sulfite, the derivatives of sulfoxylic acid such as zinc formaldehyde sulfoxylate or alkali metal formaldehyde sulfoxylates such as sodium hydroxymethanesulfinate, and ascorbic acid. The amount of reducing agent is preferably from 0.01 to 5.0% by weight, based on the total weight of the monomers.

To control molecular weight, regulating substances may be used during the polymerization, usually in amounts of from 0.01 to 5% by weight based on the monomers to be polymerized, and metered in separately or else premixed with reaction components. Examples of substances of this type are n-dodecyl mercaptan, tert-dodecyl mercaptan, mercaptopropionic acid, methyl mercaptopropionate, isopropanol and acetaldehyde.

The non-sulfonated polyesters are used for stabilization as early as during the polymerization. The amounts of protective colloids used here are from 3 to 50% by weight, preferably from 15 to 40% by weight based on the base polymer, and they are added prior to and/or during the polymerization. If desired, the non-sulfonated polyesters may also be used in a mixture with other protective colloids during the polymerization, for example, in a mixture with one or more protective colloids selected from the class encompassing partially hydrolyzed polyvinyl acetates, polyvinyl-pyrrolidones, carboxymethylcellulose, methylcellulose, hydroxymethylcellulose, hydroxyethylcellulose or hydroxypropylcellulose, starches, proteins, poly(meth) acrylic acid, poly(meth)acrylamide, polyvinylsulfonic acids, melamine formaldehyde sulfonates, naphthalene formaldehyde sulfonates, styrene-maleic acid copolymers and vinyl ether-maleic acid copolymers. The non-sulfonated polyesters are preferably used without adding other protective colloids depending on the identified end use.

The monomers may be entirely within the initial charge or entirely within the feed or proportions may be in the initial charge and the remainder metered in after initiation of the polymerization. In the preferred procedure from 10 to 100% by weight, based on the total weight of the monomers, is within the initial charge and the remainder is in the feed. The feeds may be separated (spatially and chronologically), or some or all of the components to be metered in may have been pre-emulsified.

The thermal initiator to initiate the polymerization may be entirely within the initial charge, or to some extent, within the initial charge and to some extent within the feed, or entirely within the feed.

Post-polymerization using known methods may be carried out after the polymerization to remove residual monomers, for example, using redox-catalyzed-initiated post-polymerization (used in examples as Chasers also noted above as Cataylst). Volatile residual monomers may also be removed by distillation, preferably under reduced pressure, and, if desired, by passing carrier gases such as air, nitrogen or steam, through or over the mixture.

The aqueous dispersions obtainable from the process have a solids content from up to 70% by weight, preferably 35 to 65% by weight.

The protective-colloid-stabilized polymer compositions may be used in the form of their aqueous polymer dispersions in the application sectors typical for these, for example as sole binder for coating compositions and adhesives, or as barrier coating composition or binder for textiles or paper coatings.

As a further aspect of the present invention there is provided a coating composition which comprises the polyester acrylate latex polymers as described above, further comprising none, one or more leveling, rheology, and flow control agents such as silicones, fluorocarbons or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; extenders; defoaming and antifoaming agents; anti-settling, anti-sag and bodying agents; anti-skinning agents; anti-flooding and anti-floating agents; fungicides and mildewcides such as Proxel® GXL (used in examples as In-can preservatives); corrosion inhibitors; thickening agents; or coalescing agents as noted by Clark et al. in U.S. Pat. No. 6,001,922. In addition, combination with various other ingredients that are used to treat the surface of paper such as but not limited to: starch, polyvinyl alcohol, carboxyl methylated cellulose, protein, clay, calcium carbonate, gelatin, silica, etc., etc. These other ingredients could act merely as carriers and/or diluents or they could contribute to other desirable properties that these polyester acrylate compositions alone may not supply.

EXAMPLES

The following examples are exemplary embodiments of coatings that may be produced according to the teachings of the present invention for various uses.

Example 1 is a polyester acrylate using a straight chain linear polyester as the protective colloid.

Example 1

| Components | Weight |
|---|---|
| Linear Polyester | 174 |
| Acrylate A | 408 |
| Acrylate B | 102 |
| Acid A | 11 |
| Catalyst | 1 |
| Chaser | 3 |
| Buffer | 102 |
| Distilled Water | 625 |
| In-can Preservative | 1 |

Example 1

Example 2 is a polyester acrylate using a branched saturated polyester as the protective colloid yielding a polymer that has a high crosslink density.

Example 2

| Components | Weight |
|---|---|
| Branched Saturated Polyester | 225 |
| Acrylate A | 187 |
| Acrylate B | 104 |
| Acrylate C | 16 |
| Catalyst | 1 |
| Chaser | 1 |
| Buffer A | 24 |
| Buffer B | 5 |
| Distilled Water | 615 |
| In-can Preservative | 1 |

Example 3 is a polyester acrylate using a linear unsaturated polyester as the protective colloid yielding a polymer that is crosslinkable or reactive across the double bond.

Example 3

| Components | Weight |
| --- | --- |
| Linear Unsaturated Polyester | 450 |
| Acrylate A | 374 |
| Acrylate B | 218 |
| Acrylate C | 31 |
| Catalyst | 6 |
| Chaser | 3 |
| Buffer A | 49 |
| Buffer B | 6 |
| Distilled Water | 1061 |
| In-can Preservative | 2 |

Example 4 is a polyester acrylate using a linear saturated polyester and an acid modified starch as the protective colloids yielding a polymer that has an increased bio content.

Example 4

| Components | Weight |
| --- | --- |
| Linear Saturated Polyester | 185 |
| Acrylate A | 204 |
| Acrylate B | 119 |
| Acrylate C | 17 |
| Acid Modified Starch | 60 |
| Catalyst | 3 |
| Chaser | 2 |
| Buffer A | 27 |
| Buffer B | 3 |
| Distilled Water | 579 |
| In-can Preservative | 1 |

Example 5 is a polyester acrylate using a branched ethoxylated polyester as the protective colloid yielding a polymer that has increased water solubility and dispersibility.

Example 5

| Components | Weight |
| --- | --- |
| Branched Ethoxylated Polyester | 307 |
| Acrylate A | 425 |
| Catalyst | 4 |
| Chaser | 2 |
| Buffer A | 33 |
| Buffer B | 4 |
| Distilled Water | 713 |
| In-can Preservative | 2 |

Example 6 is a polyester acrylate using an ethoxylated block co-polyester as the protective colloid yielding a polymer that has increased water solubility and dispersibility.

Example 6

| Components | Weight |
| --- | --- |
| Ethoxylated Block Co-Polyester | 199 |
| Acrylate A | 165 |
| Acrylate B | 96 |

-continued

| Components | Weight |
| --- | --- |
| Acrylate C | 14 |
| Catalyst | 3 |
| Chaser | 1 |
| Buffer B | 3 |
| Distilled Water | 718 |
| In-can Preservative | 1 |

Example 7 is a polyester acrylate using a linear saturated polyester as the protective colloid and a post-crosslinker monomer yielding a polymer that has increased cross linking of the functional monomers upon drying.

Example 7

| Components | Weight |
| --- | --- |
| Linear Saturated Polyester | 143 |
| Acrylate A | 204 |
| Acrylate B | 119 |
| Acrylate C | 17 |
| Cross-Linker A | 60 |
| Catalyst | 3 |
| Chaser | 2 |
| Buffer A | 27 |
| Buffer B | 3 |
| Distilled Water | 579 |
| In-can Preservative | 1 |

Example 8 is a polyester acrylate using a reduced amount of linear saturated polyester as the protective colloid.

Example 8

| Components | Weight |
| --- | --- |
| Linear Saturated Polyester | 59 |
| Acrylate A | 316 |
| Acrylate B | 184 |
| Acrylate C | 26 |
| Catalyst | 3 |
| Chaser | 2 |
| Buffer A | 6 |
| Buffer B | 3 |
| Distilled Water | 599 |
| In-can Preservative | 1 |

Exemplary Uses of Inventive Coatings

The non-sulfonated polyester colloidal stabilized acrylate resins of the present invention can be used to coat substrates such as cellulosic or synthetic substrates such as paper. More in particular, the polyester acrylate resins find use as coatings in the following industrial applications:

Paper

Depending on the non-sulfonated polyester colloid selected and the particular monomer selection, paper, molded fiber, and paperboard has a vast number of uses for these polymers. These polymers can impart improved physical properties to paper and paperboard of the following but not limited to: ink receptivity, water repellency, oil and grease resistance, altered surface energy, release characteristics, de-linting, board smoothness, improved gloss, improved dry strength, improved porosity, decreased moisture vapor transfer rate (MVTR), adhesion promotion, pigment binding, and heat seal-ability. With proper colloid and monomer selection, the polyester acrylates can impart the above-mentioned physical characteristics with the advantage of allowing for the paper, molded fiber, and paperboard to be fully repulpable and recyclable. In addition, due to the manner in which the polymers are synthesized these paper, molded fiber, and paperboard treated products will not inhibit the compostability of the said article. By utilizing and recycling waste polyethylene terephthalate (PET) as a major component in these polyester acrylates, there is less waste as the PET is removed from the landfill and materials treated in this manner can be made into packaging materials that can be in-turn recycled.

Oil and grease repellants have typically been measured by 3M® Kit testing. This test is comprised of solvent chemistries (toluene and heptane) in which degrade and dissolve most barrier chemistries. Since the 3M® Kit test solely relies on the surface tension to determine the quantitative amount of fluoro chemistries applied, it is not a useful tool to determine oil and grease barrier and maintain economical solutions. Without fluoro chemistries oil and grease barriers require a resistant film formation. Jain Chem, Ltd. has produced a test method similar to that of the 3M® Kit test, yet it uses natural oils and wetting aids to determine the barrier (film forming) properties of most oil and grease applications. This test is known as the JCOT (Jain Chem Oil Test). It has a scale rating of 1 to 10, where 1 being a minimal oil resistant barrier and 10 being the maximum oil barrier.

In connection with paper coating applications, the following are examples:

Paper, Molded Fiber, and Paperboard for Food Packaging

As the push for more sustainable coating chemistries evolve, the disclosed polyester acrylates described above, would be ideal candidates for use in many paper, molded fiber and paperboard applications. Commercially available coatings to date typically use paraffinic waxes, polyethylene, extruded or blown PET, fluoropolymer, silicones, chromium-based chemistries or other water-based styrene acrylic polymers. These solutions have various advantages and disadvantages with their intended use. Most of these solutions have toxicity, environmental concerns and may or may not be considered recyclable or compostable. The selection of proper colloid and monomers described in this invention will result in FDA compliant polymers that can be acceptable for all types of food and food packaging. The polyester acrylate polymers described in this invention are composed of raw materials that have a reputation of being generally regarded as safe and non-toxic.

Application methods are various and can be used for many of the applications listed below. Proper selection of monomers and the polyester colloid will produce a polyester acrylate that can be applied on machine and produce JCOT values from 3 to 10 depending on the coat weight and wet pick up achieved on machine by use of and applied at the size press selected from the group including rod-metered size press, puddle size press, blade-metered size press, curtain coater size press, vertical size press, horizontal size press, metering size press, gated roll metering size press, doctor blade metering size press, and a combination thereof or other coating equipment on machine or off line coating equipment. This solution may not meet economical requirements, therefore depending on the final application a host of additives can be combined with the polyester acrylate. The coating composition may comprise a mixture of: (1) a coating pigment(s); (2) a binder or binders; and (3) various functional additives. Pigments could range from inorganic fillers such as clay, mica, talc, calcium carbonate, titanium dioxide, carbon black, etc. Binders such as the polyester acrylate described in this invention in combination with other binders such as polyvinyl alcohols (PVOH), alginates modified starch, styrene butadiene rubber, polyvinyl acetate, vinyl acrylic, etc. Additives could range from dispersants; defoamers; cross-linking agents; synthetic surface sizing agents, such as styrene acrylic emulsions (SAE), styrene maleic anhydride (SMA), or alkyl ketene dimer (AKD); thickeners such as cellulose based viscosity modifiers such as methyl-, hydroxyethyl-, carboxymethyl-, and alkali swellable acrylates; Lubricants including hydrogenated oils, lecithin, oil based lubricants; etc. It is to be understood that various changes and modifications of these coating compositions may be apparent to those skilled in the art of paper manufacturing and coating development.

Proper selection of monomers and the polyester colloid will produce a polyester acrylate that can be applied off machine and produce JCOT values from 3 to 10 depending on the coat weight achieved by use of a rod coater, Invocoater, a blade coater, an air knife coater, a spray coater, a curtain coater, a slot die coater, an iso-bar rod coater, a high speed metering contour type coater, a gravure coater, a reverse gravure coater, roll coater or by flexography.

Specific applications of food packaging are described below:

Lightweight Paper

Most lightweight papers used in the food service industries typically are for sandwich wrap, pouches/bags, pan liners, tray or basket liners, butter wrap, and bag liners. These lightweight papers often require oil and grease barrier properties depending on the conditions of the use. Some of these may require hydrophobic character and or release characteristics. In most applications per-fluorocarbons (PFCs), chromium complexes, polyethylene extrusion was and other chemistries have been used. With the targeted elimination of PFC chemistries from the food service market, a void has been created. With the chemistries described in this invention, there are many application methods on machine and off-line that can be utilized to meet the final requirements of the use.

Folded Carton Stock

Folded carton stock can range from fast food service items to retail food packaging to prevent oil and grease penetration, water hold out, MVTR or oxygen barrier, and or frozen food release. These cartons may require minimal hold out or high degrees of barrier. For minimal grease barrier it may be able to incorporate this invention into the online board manufacturing process or gravure application to applied during the printing and converting process. Examples of such applications could be disposable fast food trays for fries or other greasy foods, cartons for greasy foods such as pie, fried foods, etc, where minimal grease resistance is needed for short periods of time. For higher severity end use requirements, a combination of coatings may be used to achieve these requirements such a base coating to seal the board and then a topical coating to achieve the desired physical characteristics. An example of a high barrier fast food requirement might be Chinese takeout boxes. Not only does this box need high oil and grease resistance and high level of hydrophobic character, it will require these properties with severely scored and creased corners. The selection of monomers and non-sulfonated polyester colloid would be critical to create a low Tg flexible polyester acrylate coating to prevent oil and grease penetration. Longer term folding carton examples may be frozen produce or meats where MVTR or oxygen barrier may be required. This may incorporate other coating component and additives as listed above in combination with these polyester acrylates described in this invention to achieve these results. It is to be understood that various changes and modifications of these coating compositions may be apparent to those skilled in the art of paper manufacturing and coating development.

Paper Plates and Disposable Press-Ware

As described in U.S. Pat. No. 6,893,693 by Swoboda, et al., the paperboard is typically composed of two different layers of coatings. The primary base coating is typically applied at a mill location composed of two bumps of a moisture resistant "clay" coatings. These "clay" coatings typically use a high loading of pigments, such as clay, calcium carbonate, starch or a combination thereof, and a Styrene Butadiene (SBR) binder to achieve a coating that is white, smooth, and receptive to normal printing processes, yet moisture resistant. These types of mill-applied pigmented coating typically are not considered as questionably compostable under ASTM D6868 as described by Pang et. al. in U.S. Pat. No. 9,670,621. The polyester acrylate described in this invention would provide for a suitable binder in which would be considered oil and grease resistant, moisture resistant, as well providing more a more compatible alternative. The second layer of coating for press-ware is typically an acrylic that would improving the wet rigidity of a food container by providing for water and oil and grease hold out. As described by Swobada et al. in U.S. Pat. No. 6,893,693 this coating must also be able to conform to the processing conditions in the formation of press-ware. With the correct monomer and polyester colloid selection, the non-sulfonated polyester acrylate can be used to prevent moisture and oil and grease penetration into the press-ware. It can also provide for elasticity to prevent cracking during the formation process as well as release characteristics from the press itself under high temperature conditions.

Paper Cups/Liquid Containers

Disposable paper cups have been in common use over the last few decades. However, even though these cups are made from paper, the aqueous phase hold out mechanism has been primarily wax-coated or polyethylene extruded plastics. Due to the wax or the polyethylene plastic, these cups were considered non-biodegradable nor recyclable. In recent years polylactic acid (PLA) and polybutylene succinate (PBS) polymers have been introduced to replace extruded low-density polyethylene (LDPE). Yet, even though these polymers are considered biodegradable yielding a cup that is compostable, these cups cannot be recycled for the same reasons as LDPE. Thus, the economic benefits are not realized and actually increased due to slow production and increased polymer costs. The non-sulfonated polyester acrylate described in this invention has provided for an aqueous based coating solution that is more compostable than standard styrene acrylic polymers as well as being recyclable. These coatings have been tested to give a hot fill cup as well as cold fill cup. The difference between the two is primarily the cold cup has an anti-condensate coating on the outer sidewall. With proper monomer selection and non-sulfonated polyester colloid selection, the polyester acrylate makes a very desirable cup coating. Typically, this coating requires a primer coating that may or may not contain pigmented fillers to yield a smooth surface that can be printed or treated with another topical coating as described in this invention.

Standard solid bleached sulfate (SBS) paperboard basestock has typically been used, but not limited to, in the manufacture of cup stock. However, this invention prefers base stock paperboard that has been treated internally to prevent the edge wicking of acidic and hot fluids. This technique is widely used in hot cup and cold cup paperboard and may vary in the production of. An example of imparting hot penetrant resistance is disclosed in Ehrhardt's U.S. Pat. No. 20110017417. The coating of aqueous barrier coatings for cup and containers have been long known to those versed in the art and examples can be seen in U.S. Pat. Nos. 20180058010, 5,763,100, 9,732,474, 10,590,606, and 20160168799.

The above-mentioned polyester acrylates described in this invention allows for the use of these polymers on machine as well as off-line coated. The primer coating composition may comprise a mixture of: (1) a coating pigment(s); (2) a binder or binders; and (3) various functional additives. Pigments could range from inorganic fillers such as clay, mica, talc, calcium carbonate, titanium dioxide, carbon black, etc. Binders such as the polyester acrylate described in this invention in combination with other binders such as polyvinyl alcohols (PVOH), alginates modified starch, styrene butadiene rubber, polyvinyl acetate, vinyl acrylic, etc. Additives could range from dispersants; defoamers; cross-linking agents; synthetic surface sizing agents, such as styrene acrylic emulsions (SAE), styrene maleic anhydride (SMA), or alkyl ketene dimer (AKD); thickeners such as cellulose based viscosity modifiers such as methyl-, hydroxyethyl-, carboxymethyl-, and alkali swell-able acrylates. The preferred binder for this application would be the polyester acrylate described above. Lubricants including hydrogenated oils, lecithin, oil-based lubricants; etc. It is to be understood that various changes and modifications of these coating compositions may be apparent to those skilled in the art of paper manufacturing and coating development.

This primer coating typically ranges from 15 to 72% solids. The primer coating could be applied on the paperboard with online coaters typically used to produce "clay coated" paperboard. The typical coating methods for these types of paperboard machine include rod coater, Invo-coater, a blade coater, an air knife coater, a spray coater, a curtain coater, a slot die coater, an iso-bar rod coater, or a high speed metering contour type coater. This Primer coat could also be applied off-line using the same type of coater systems. The functional top coating typically runs from 25 to 60% solids and should be applied on previous primer treated boards, as previously described, and is more suited for off line coaters which may include a rod coater, Invo-coater, a blade coater, an air knife coater, a spray coater, a curtain coater, a slot die coater, an iso-bar rod coater, a high speed metering contour type coater a gravure coater, a reverse gravure coater, roll coater or by flexography. This is due to the heat seal-ability of the functional topcoat and needs to be chilled to below 100° F. prior to being rewound and avoid blocking in large rolls.

The same non-sulfonated polyester acrylate coatings can be used for both the cold cup and hot cup. However, the construction of these two types of cups are commercially known and illustrated in U.S. Pat. Nos. 4,187,768, 4,452, 596, 4,715,527, 5,507,640, 5,694,746, 6,652,435, and 8,852, 493.

For the Cold Cup side walls, the primer coating layer of 5-15 gsm is applied at the inside of the cup, while at the outside only 2-12 gsm is needed as an anti-condense layer. Furthermore, for the inside layer a topical coating layer of 3-10 gsm would be applied so that a complete barrier of the cup stock paper is obtained. This inside double layer is needed to obtain a good barrier against liquids but also to obtain the heat seal ability. The cold cup bottom stock, the primer coating layer of 5-15 gsm is applied to both sides of the paperboard. Furthermore, a layer of topical coating of 3-10 gsm is applied to both sides of the paperboard. The double layer is needed to obtain a good barrier against liquids but also to obtain the heat seal ability needed to perform the double wrap bottom.

The Hot Cup is the same coating set up except the side walls do not require an anti-condense layer on the outer wall of the cup.

Molded Fiber Food Containers

Molded Fiber Food containers can range from fast food service items to retail food packaging to prevent oil and grease penetration, liquid hold out, and or MVTR or oxygen barrier. These containers typically have used fluorocarbon (FC) chemistries incorporated into the pulp prior to the forming process. The pulp fiber itself may be derived from any natural cellulosic fiber such as hard wood, soft wood, various grasses, hemp, coconut shells, palm, eucalyptus, cane, etc. The FC chemistries have been used in applications that might require minimal grease and oil or liquid hold out or high degrees of barrier. It has been shown that polyester chemistry has been able to be incorporated into the pulp and provide for a slightly water-resistant molded pulp with excellent anti-wicking properties. As described by U.S. Pat. Nos. 20030127210, 10,065,779, 20110011549, and 20200181849 These non-sulfonated polyester acrylates described in these chemistries can also impart the same anti-wicking properties as well as improved wet strength just by replacing the polyester portion in the previous described patents.

Since the anti-wicking chemistries incorporated in the pulp only yield a lightly water repellant and non-wicking molded pulp article, it will not hold out grease nor prevent oil from wicking without a topical coating being applied to form a film barrier over the exposed areas of the molded pulp article. This will require the use of a spray system or dipping system followed by an air knife to blow off excess coating and then a heating system to dry the coating. This has been described in Harmon's U.S. patent Ser. No. 10/065, 779. Depending on the end use requirements, the dry coat weight will vary. Examples of such applications could be disposable cups or lids, cold trays for meats and vegetables, disposable take out containers, plates, utensils, bottles, etc. The selection of monomers and non-sulfonated polyester colloid would be critical to create good film forming flexible polyester acrylate coating to create a water, alcohol, oil barrier film. For longer term or higher barrier requirements additional formulation or additional layers may need to be incorporated. This may incorporate other coating component and additives as listed above in combination with these polyester acrylates described in this invention to achieve these results. It is to be understood that various changes and modifications of these coating compositions may be apparent to those skilled in the art of coating development.

Printing Paper

These polyester acrylates are ideal for use in the paper making processes. Due to the mechanical stability of these polymers and ideal viscosity, application of these are ideal for the paper making process. Size press, rod coaters, water box, air knifes, and gravure applicators are desired applications methods for the polymers described in this invention. These polymers can be used as-is or as additives in conventional paper making methodologies. The proper colloid and monomer selection described in this patent will allow for easy to clean coating chemistries that will provide ink holdout, ink receptivity, surface smoothness, and excellent water hold out. These papers could be used in copy/printing paper, magazine stock and or label stock. The application of these polymers to the surface of the sheet will impart hydrophobic character and keep label stock from wicking moisture and maintain strength in uses such as alcoholic beverages or other weather-able containers that are subject to water. Application of the above described invention as an over print will provide a barrier to keep graphics from being rubbed off or distorted due to friction and or environmental elements as well as maintain gloss.

Paper, Molded Fiber, and or Paperboard for Storage or Transport

Corrugated boxes have long been the primary mode of storage and transport of a multitude of applications. Commercial treatments range from paraffinic wax impregnation, styrene acrylic coating containing paraffinic wax, and or treatment with hydrogenated triglycerides as described in U.S. Pat. No. 20130042975 A1 (Bugas, et al.). The downside of these types of applications mainly relates to the disposition of the package once disposed. Wax containing cartons are usually incinerated or landfilled. The packages containing heavy amounts of hydrogenated triglycerides may have a significant impact on the repulping process and or the quality of the paperboard produced thereof. Liner board treated with the polyester acrylate polymers mentioned in this invention will be ideal for increasing storage life and protect the contents of the container from elements due to the hydrophobic characteristics of the polymer that allows for reduced vapor transmission to the paperboard and maintain strength. Ogilvie et al. describes a process for coating and corrugated box characteristics in U.S. Pat. No. 6,113, 981, in which these chemistries would be ideal.

Paper bags such as feed, seed, retail pouches, grocery, letters, envelopes, courier packages and many other bags or pouches may lose strength and tear easily due to water and oil saturation and expose the items being protected. Current technology relies heavily on the use of fluoropolymers, silicones, wax and other extruded plastics to prevent water and oil penetration of the bag. The application of these coatings via offline application and or on paper machine applications of the above mentioned invention can provide for oil and grease resistance, water resistance, and or reduced MVTR properties which protects the content of the bag as well as the consumer from the bag tearing or oil and grease escaping the package. This has a significant impact as less paper fiber can be used to produce the package as well as these bags can be recycled or composted with ease.

Molded fiber has long been used as a means to package and transport including pallets, electronics, machinery and parts either in the package or as the package itself. The fiber itself may be derived from any natural cellulosic fiber such as hard wood, soft wood, various grasses, hemp, coconut shells, palm, eucalyptus, cane, etc. The current uses are usually low in cost but are limited to internal packaging and do not have any water resistance, low in strength, impart lint and dust, and may scratch or mar the in protected item. Where this type of packaging is used it may be necessary to use plastic bags, films or other protection to protect the item contained. By use of the above described invention, the pulp can be treated with the polyester acylate internally or topically by spray application to impart a high strength, mar resistant, non-linting protective package. Depending on the colloid and monomer selected, water and grease resistance could be imparted to further protect the item contained within the molded fiber structure.

Release Paper and Film

Release coating are used in various applications from labels, interleaf, polymer mold release, and retail packaging, to allow for an easier release of an adhesive or other polymer or sticky substance from the surface it is applied. Currently silicones, polyvinyl carbamates, fluoropolymers, chromium-based chemistries are the largest used released agents. The polyester acrylates described in this invention can be prepared with proper colloid and monomer selection to provide a polymer that can be applied on a surface to allow for easier release. Due to the hydrophobic and oil and grease resistance these polyester acrylates can be applied to paper, film, and or metal to provide for an easier release from a variety of adhesives, phenolics and the like.

Textiles

Depending on the non-sulfonated polyester colloid selected and the particular monomer selection, textiles have several needs in sizing, finishing, and garment applications.

In connection with textile applications, the following are examples:

Sizing

Polymeric substances are well known in prior art for use as textile sizes. The water-based sizing agent is conventionally used in the sizing process to improve the weavability of the fiber or non-woven. This sizing compound may or may not need to be removed through a de-sizing process. This product may add lubricity, tensile strength, elongation, toughness, etc. of the fiber or nonwoven article. This product would be used as an additive in size bath applications or as-is with proper colloid and monomer selection.

Finishing

The non-sulfonated polyester acrylates described here can find applications in a number of areas in the textile and carpet finishing. Soil release and anti-staining agents have typically been comprised of carboxylated acrylic polymers, polyesters comprised of POE based block copolymers, Fluoro chemistries cross linked sulfonated polyesters, and fluoropolymers depending on the desired durability. These applications of these types of products are taught in U.S. Pat. No. 4,329,389 (Kimbrell), U.S. Pat. No. 5,234,753 (Williams), U.S. Pat. No. 4,518,649 (Wang et al.), U.S. Pat. No. 6,008,182 (Salsman et al.), U.S. Pat. No. 6,458,443 (Collier, et al.). Chemistries described in this invention are ideal for these applications.

Wicking and moisture management polymers have been used to treat fabrics to wick moisture away from the skin providing a cooling effect on the skin. The process for application and competitive chemistries are described in U.S. Pat. No. 8,410,041 (Kutsenko et al.). The proper selection of colloid and monomers described in this invention could be used in these applications.

Garments

Anti-redeposition of dyes and colorants during wash and laundering of garments has long been a known issue especially in the denim manufacturing process. U.S. Pat. No. 6,008,182 (Salsman et al.) describes a process of a water-soluble or water-dispersible polyester resin in a fabric washing process to inhibit dye bleed-off from dyed fabric and from redepositing onto another fabric or to a different location on the same fabric. Also, the use of enzymes in conjunction with these types of polymers address the general problem known in "stone washing" methods is that of backstaining, i.e., a phenomenon whereby dye already removed by abrasion deposits on parts of the fabric or garment so as to even out the desired variation of color density or to discolor any light-colored parts of the garment is described in U.S. Pat. No. 8,198,068 (Wu et al.) An anti-redeposition polymer is added in conjunction with surfactants and enzymes to prevent indigo from redepositing on the denim.

Hydrophobic and Oil Resistant Fabrics

In some instances, it is desirable for a fabric to have a treatment or protective coating to exhibit a certain amount of water repellency. Some of these areas of application include upholstery, clothing or apparel in general, tarps, rainwear, nonwovens, nylon micro-denier fabrics, bedding, mail bags, reapplication of waterproofing agents and footwear.

The colloid and monomer selection of the non-sulfonated polyester acrylate and the amount of the composition applied to a substrate in accordance with the present invention is chosen so based on the desirable water and oil repellencies, lubrication, gloss, wicking and other desired properties are imparted to the substrate surface, The amount which is sufficient to impart desired property can be determined empirically and can be increased as necessary or desired.

The treatment of fibrous substrates imparting composition of the present invention is carried out by using well-known methods including dipping, spraying, padding, knife coating, and roll coating. Drying of the substrate is done at 120° C. or below, including room temperature, e.g., about 20° C. with optionally heat-treating the textile products in the same manner as in conventional textile processing methods.

Wood

Wood products especially those used in outdoor applications, need to be protected from rain and weather. The non-sulfonated polyester acrylates described here can be used to waterproof wood products. Some examples of wood products where the described polymers could be applied are: Furniture, wood decks, fencing, construction lumber, plywood, wood for concrete molds, siding for houses, telephone poles, roofing tiles, paneling for interior walls, wooden crates and boxes for shipping and storing, and wooden boats or boat parts.

Concrete

It is desirable in some concrete applications for there to be a sealer or water-resistant finish applied to the concrete after it has set. This finish provides increased durability and longer life of the concrete surface as well as allowing rainwater to run off more effectively. The products described in this invention can be used for this purpose. Some examples are driveways, sidewalks, decorative flooring, roadways and concrete housing.

Paint

In some instances, it is desirable for a paint (or protective coating) to exhibit a certain amount of water repellency. An example is general purpose Latex. In this case, the inventive polyester acrylate can be used as additives or stand-alone depending on the end use.

Leather

Leather products can be treated for water repellency. Here the added gloss would also be desirable. Typical leather products include shoes, belts, handbags, animal tack, coats and gloves.

Inks

In the ink market resins are used to adhere the ink to some substrate. Once dry they must be moisture and abrasion resistant. Many currently used resins are water based. The described resins here would make ideal candidates as ink resins or additives since the polyester acrylates can be selected to provide adhesion to various substrates, and once dry would be very water resistant.

Glass

Fiberglass is used as the structural material for a great deal of commonly used items such as shower stalls, boats, kitchen and bathroom sinks. The described resin could be used as part of the formulation to make these products repel water more effectively. The dispersions of this invention could also be used to treat the glass fibers themselves, as in sizing, for greater water repellency or greater resin solubility.

Metal Coatings

Metal coils are commonly coated with a resin to prevent rust or oxidation caused by moisture in the air. The currently used products are generally resins dissolved in some solvent. The resins described here could be used as replacements for these coatings.

Floor Polish

The colloid and monomer selection of the non-sulfonated polyester acrylate and the amount of the composition applied to a substrate in accordance with the present invention is chosen so based on the desirable water and oil repellencies, lubrication, gloss, wicking and other desired properties are imparted to the substrate surface, The amount which is sufficient to impart desired property can be determined empirically and can be increased as necessary or desired.

The treatment of fibrous substrates imparting composition of the present invention is carried out by using well-known methods including dipping, spraying, padding, knife coating, and roll coating. Drying of the substrate is done at 120° C. or below, including room temperature, e.g., about 20° C. with optionally heat-treating the textile products in the same manner as in conventional textile processing methods.

All references cited in this specification, including without limitation, all papers, publications, patents, patent applications, provisional patent applications, presentations, texts, reports, manuscripts, brochures, books, internet postings, journal articles, and/or periodicals are hereby incorporated by reference into this specification in their entireties, including all figures and tables, to the extent they are not inconsistent with the explicit teachings of this specification. The discussion of the references herein is intended merely to summarize the assertions made by their authors and no admission is made that any reference constitutes prior art. Applicants reserve the right to challenge the accuracy and pertinence of the cited references.

What is claimed is:

1. A process for emulsion polymerization, the improvement comprising the step of using a non-sulfonated polyester as a protective colloid in the process, wherein the non-sulfonated polyester is an ethoxylated polyester.
2. A product made by the process of claim 1.
3. A coating comprising the product of claim 2.

* * * * *